United States Patent [19]

Kinoshita

[11] Patent Number: 4,677,544
[45] Date of Patent: Jun. 30, 1987

[54] DEVICE FOR CONTROLLING ACCESS TO A COMPUTER MEMORY

[75] Inventor: Kouji Kinoshita, Tokyo, Japan

[73] Assignee: NEC Corporation, Tokyo, Japan

[21] Appl. No.: 684,957

[22] Filed: Dec. 21, 1984

[30] Foreign Application Priority Data

Dec. 23, 1983 [JP] Japan ................ 58-243323

[51] Int. Cl.⁴ .................................... G06F 12/00
[52] U.S. Cl. .......................................... 364/200
[58] Field of Search ... 364/200 MS File, 900 MS File

[56] References Cited

U.S. PATENT DOCUMENTS

| | | | |
|---|---|---|---|
| 3,827,031 | 7/1974 | Kastner et al. | 364/200 |
| 4,050,094 | 9/1977 | Bourke | 364/200 |
| 4,079,455 | 3/1978 | Ozga | 364/200 |
| 4,128,880 | 12/1978 | Cray, Jr. | 364/200 |
| 4,156,905 | 5/1979 | Fassbender | 364/900 |
| 4,293,941 | 10/1981 | Muraoka et al. | 364/200 |
| 4,310,880 | 1/1982 | Gehman | 364/200 |
| 4,399,507 | 8/1983 | Cosgrove et al. | 364/200 |
| 4,435,765 | 3/1984 | Uchida et al. | 364/200 |
| 4,490,786 | 12/1984 | Nokatani | 364/200 |

OTHER PUBLICATIONS

Cray Research, Inc., "Cray-1 S Series Hardware Reference Manual", Pub. No. HR-0808, 1981.

Primary Examiner—Gareth D. Shaw
Assistant Examiner—Kevin A. Kriess
Attorney, Agent, or Firm—Schwartz, Jeffery, Schwaab, Mack, Blumenthal & Evans

[57] ABSTRACT

While a first access request signal is sent to a memory for a first data of a first data element number of leading through trailing elements, a register (12) holds a trailing address which is assigned to a memory unit for the trailing element. Responsive to a second access request signal for a second data, a difference calculator (13, 14) calculates a difference between the trailing address and a leading address which is assigned to a memory unit for the leading element of the second data. While the first access request signal is sent to the memory, another register (15) holds a reference number that is equal to a memory unit cycle time during which each memory unit is rendered busy by each access request signal. After disappearance of the first access request signal, the reference number is reduced one per clock cycle. A comparator (17, 18) compares the difference with the reference number to produce an access enabling signal which enables delivery of the second access request signal to the memory when the reference number becomes not greater than the difference taking into consideration the number of memory units accessed in each clock cycle.

4 Claims, 3 Drawing Figures

FIG. 1

| MEMORY UNITS | 0 | 1 | 2 | 3 | 4 | 5 | 6 | | 62 | 63 |
|---|---|---|---|---|---|---|---|---|---|---|
| ADDRESSES | 0 | 1 | 2 | 3 | 4 | 5 | 6 | | 62 | 63 |
| | 64 | 65 | 66 | 67 | 68 | 69 | 70 | | 126 | 127 |
| | 128 | 129 | 130 | 131 | 132 | 133 | 134 | | 190 | 191 |
| | 192 | 193 | 194 | 195 | 196 | 197 | 198 | | 254 | 255 |

FIG. 3

| TIME INSTANT | $T_0$ | $T_1$ | $T_2$ | | $T_{15}$ | $T_{16}$ | $T_{17}$ | $T_{18}$ |
|---|---|---|---|---|---|---|---|---|
| MEMORY UNITS ACCESSED FOR 1st DATA | 0~3 | 4~7 | | | 60~63 | | | |
| INTERVAL WHERE MEMORY UNITS 1~3 ARE BUSY | | BY 1st DATA | | | | | BY 2nd DATA | |
| INTERVAL WHERE MEMORY UNIT 4 IS BUSY | | | BY 1st DATA | | | | BY 2nd DATA | |
| MEMORY UNITS ACCESSED FOR 2nd DATA | | | | | | | 1~4 | 5~9 |
| REFERENCE NUMBER | 16 | 16 | | | 16 | 15 | 16 | 16 |

DEVICE FOR CONTROLLING ACCESS TO A COMPUTER MEMORY

BACKGROUND OF THE INVENTION

This invention relates to a device for controlling access in an electronic digital computer or a like information handling system a memory, namely, a storage system, successively for a plurality of data which are generally vector data.

In the manner which will later be described in detail, a memory under consideration comprises consecutively numbered memory units accessible by serial addresses which are cyclically assigned to the memory units according to the consecutive numbers thereof. The access is carried out at the lapse of clock or machine cycles for a predetermined number of memory units per clock cycle by access request signals for the respective data. Each data consists of sequential data elements of a number which is prescribed for the data in question. The data elements of each data comprise a leading or beginning and a trailing or ending element. The memory units are for storing the data elements of the data. Each access request signal indicates the addresses assigned to the memory units which are for the data elements of the data accessed by the access request signal and each of which is rendered busy by the access during a predetermined time interval known as a memory unit cycle time or a cycle period of the memory units as it is known in the art. It is possible to understand that the access request signal indicates the number prescribed for the data and a leading address which is assigned to the memory unit for the leading element of the data. In the order of successive access, each pair of the data will be referred to herein as a first and a second data. The access request signals for the first and the second data will be called a first and a second access request signal, respectively.

A device of the type described, is disclosed in an article contributed by L. J. Boland et al to IBM Journal of Research, Vol. 11, pages 54–68 (January 1967), under the title of "The IBM System/360 Model 91: Storage System". With the device according to Boland et al, the access is carried out one data element per clock cycle. Conflicts between the memory units are avoided by sending an access request signal to the memory after the memory units which should be accessed are preliminarily confirmed that they are not busy. In other words, the second access request signal is held for recycling if at least one memory unit is under access by the first access request signal.

It is a recent trend to access a plurality of memory units per clock cycle in the manner described heretobefore in order to raise the throughput. In this event, the Boland et al device must comprise an increased amount of hardware.

Another device of the type is described in a manual which is first published 1980 by Cray Research, Inc., for Cray-1 Computer Systems of the type revealed in U.S. Pat. No. 4,128,880 issued to Seymour R. Cray, Jr., and assigned to the above-mentioned Cray Research, Inc. According to "Cray-1 S Series Hardware Reference Manual HR-0808" of the manual, the amount of hardware is reduced by making all memory units of the memory look busy in response to each access request signal during the memory unit cycle time. The access to the memory by the second access request signal is therefore delayed even for those of the memory units which should be accessed by the second access request signal which are not accessed by the first access request signal.

SUMMARY OF THE INVENTION

It is therefore an object of the present invention to provide a device for controlling access to a memory, which device need not comprise an increased amount of hardware.

It is another object of this invention to provide a device of the type described, which is operable at a high speed.

According to this invention, there is provided a device for controlling access to a memory successively with lapse of clock cycles by access request signals for a first and a second data. Each data consists of a sequence of data elements and comprises a leading and a trailing element. The memory comprises consecutively numbered memory units which are accessible by serial addresses cyclically assigned thereto according to the consecutive numbers thereof and are for storing the data elements of the first and the second data. The access is carried out for a predetermined number of memory units per clock cycle with each memory unit rendered busy during a predetermined time interval. The access request signals indicate the number of data elements in a sequence for the first and the second data and leading addresses which are assigned to the respective memory units for the leading elements of the first and the second data. The device comprises: address calculating means responsive to the number and the leading address indicated by each access request signal for calculating a trailing address which is assigned to the memory unit for the trailing element of the data accessed by the access request signal; address holding means for holding the trailing address; difference calculating means coupled to the address holding means and responsive to the leading address indicated by the access request signal for the second data for calculating a difference between the trailing address held in the address holding means for the first data and the leading address for the second data; number calculating means for calculating, after a particular clock cycle in which first access request signal disappears, a reference number which is equal to the predetermined time interval minus the number of clock cycles next following the particular clock cycle; and compairng means for comparing the difference calculated by the difference calculating means with the reference number calculated for the first data to produce an access enable signal for use in enabling access to the memory by the access request signal for the second data.

BRIEF DESCRIPTION OF THE DRAWING

FIG. 1 is a schematic diagram of a memory, access to which is controlled by a device according to the instant invention;

FIG. 3 is a time chart for use in describing operation of the device illustrated in FIG. 2.

DESCRIPTION OF THE PREFERRED EMBODIMENTS

Figure 2:
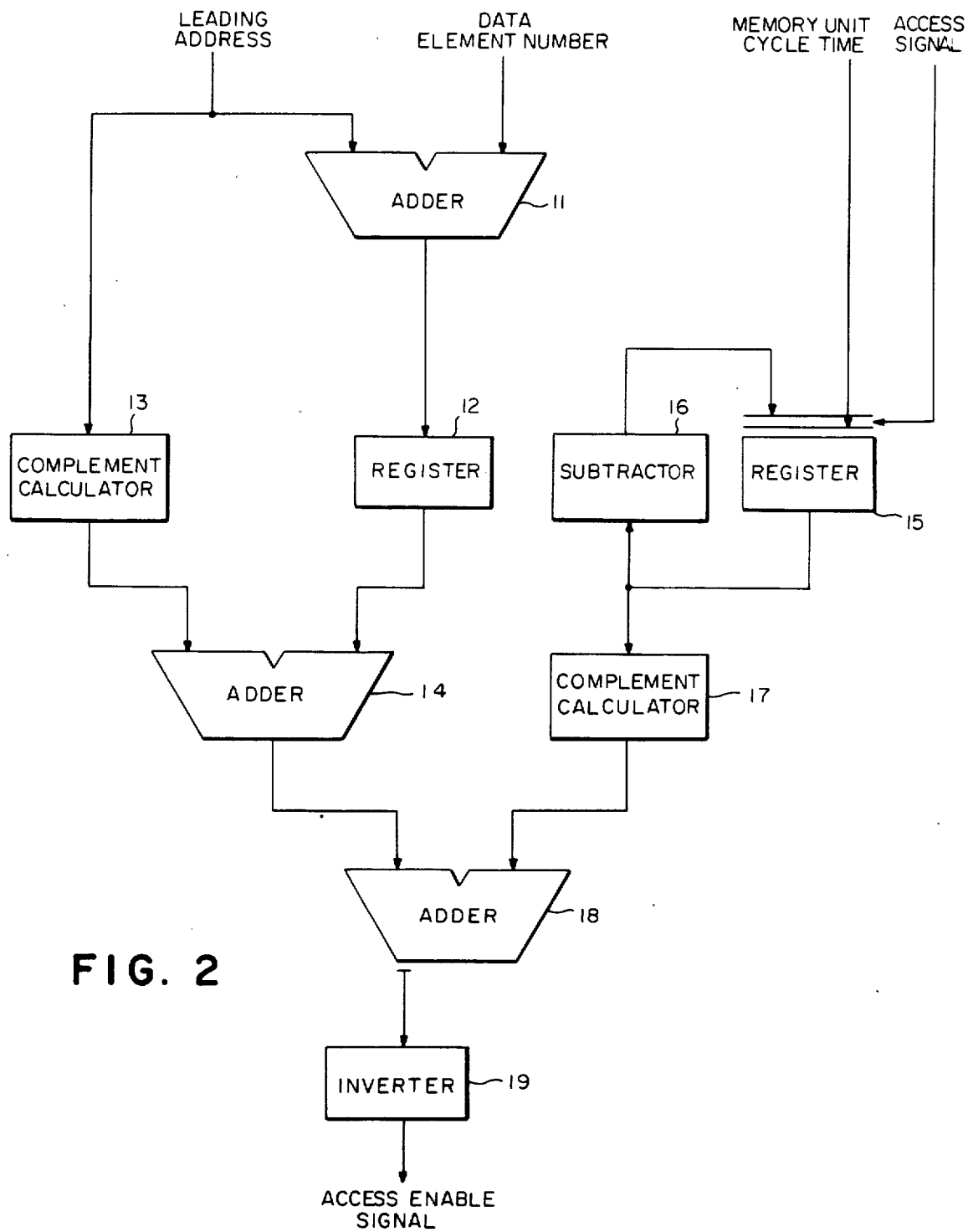
FIG. 2 is a block diagram of a device according to an embodiment of this invention.

Referring to FIG. 1, a memory of an electronic digital computer will be described at first in order to facilitate an understanding of the present invention. Access to the memory is controlled by a device according to this invention. The memory comprises a plurality of consecutively numbered memory units accessible by serial addresses which are cyclically assigned to the memory units according to the consecutive numbers thereof. In the example being illustrated, sixty-four memory units are numbered from 0 up to 63. Addresses 0, 1, and so forth are cyclically assigned to the memory units 0 through 63. The memory units are for storing data elements of a plurality of data, one data element in one memory unit. In the manner known in vector machines, each data usually is given by a sequence or an ordered array of data elements of a number which is prescribed for the data under consideration. The number may be called either a data element number or a vector length. The data elements of each data comprises a leading or beginning and a trailing or ending element. The data element number is generally less than the number of memory units of the memory. The data element number, however, has no theoretical upper limit. When the data element number is equal to unity, the data is a scalar data. The leading and the trailing elements coincide with each other.

Access to the memory is carried out successively at the lapse of clock or machine cycles by access request signals which are produced for the respective data by a central processing unit (not shown). Each memory unit is rendered busy by the access during a predetermined time interval known as a memory unit cycle time in the art. Each access request signal comprises an access signal of a predetermined logic level and an address indicating signal indicative of the addresses assigned to those of the memory units which are for the data elements of the data accessed by the access request signal in question. The access is carried out a predetermined number of memory units per clock cycle. The predetermined time interval and the predetermined number are variable according to modes of operation of the computer.

Referring now to FIG. 2, a device according to a preferred embodiment of this invention is for use in controlling access to a memory of the type illustrated with reference to FIG. 1. In conjunction with the device, it is possible to understand that each access request signal indicates the data element number of the data thereby accessed and a leading address which is assigned to the memory unit for the leading element of the data.

The device comprises a trailing address calculating adder 11 responsive to the data element number and the leading address indicated by each access request signal for calculating a trailing address which is assigned to the memory unit for the trailing element of the data accessed by that access request signal. More particularly, the adder 11 adds the data element number to the leading address to provide a sum and subtracts one from the sum to provide a result of calculation. A trailing address register 12 is for holding the result of calculation as the trailing address until a new trailing address is calculated by the adder 11 for a data which is accessed by a next following access request signal.

The leading address is delivered to a two's complement calculator 13 for calculating a two's complement of the leading address. In cooperation with the two's complement calculator 13, an adder 14 serves as a difference calculator, being supplied with the trailing address held in the register 12 for a first data accessed by a first access request signal and with the two's complement of the leading address assigned to the memory unit for the leading element of a second data which should be accessed by a second access request signal next following the first access request signal. The adder 14 calculates a sum modulo the number of memory units of the memory and thereby a difference between the trailing address for the first data and the leading address for the second data.

It will now be assumed that the predetermined number of memory units per clock cycle is equal to four. That is, four consecutive memory units of the memory are accessed in each clock cycle. For the purpose which will become clear as the description proceeds, the adder 14 produces a first adder output signal representative of a shifted difference which is given by rightwards shifting the difference two bits and then dropping two least significant bits. The shifted difference is equal to a greatest integer that is not greater than a quotient given by dividing the difference by the predetermined number of memory units.

An input signal is delivered to a reference number register 15 through a selector controlled by the access signal of the access request signal. The reference number register 15 is for holding a reference number which will presently become clear. The selector is supplied with a cycle time signal representative of the predetermined time interval or the memory unit cycle time and also with a subtractor output signal which is produced by a subtractor 16 and represents what will be called a reduced number for the time being. Throughout the time during which the access signal takes the predetermined logic level, the selector selects the cycle time signal as the input signal. Otherwise, the selector selects the subtractor output signal as the input signal. The reference number register 15 therefore holds, as the reference number, the predetermined time interval and the reduced number while the access request signal takes the predetermined logic level and does not, respectively. A reference number signal representative of the reference number is delivered to the subtractor 16, which subtracts one per clock cycle from the reference number supplied thereto to provide the reduced number as a new reference number, which is held in the reference number register 16 only when the access signal does not take the predetermined logic level.

Let it be assumed that the access request signal for a data disappears in a particular clock cycle. The access signal takes the predetermined logic level until the particular clock cycle. In the meantime, the reference number represents the predetermined time interval. After the particular clock cycle, the reference number represents the predetermined time interval minus the number of clock cycle or cycles which next follow the particular clock cycle. A combination of the reference number register 15 and the subtractor 16 serves as a reference number calculator. As will shortly become clear, the reference number is calculated for the first data for controlling access to the memory for the second data. It is therefore possible to understand that the reference number calculator calculates that reference number after the particular clock cycle which is equal to the predetermined time interval minus the number of clock cycles next following the particular clock cycle.

Another two's complement calculator 17 is responsive to the reference number signal for calculating a two's complement of the reference number. An adder 18 is for calculating a sum of the last-mentioned two's complement and the shifted difference to produce a second adder output signal representative of the most significant bit of the last-mentioned sum. An inverter 19 is for inverting the second adder output signal into an access enable signal, which is fed back to the central processing unit. Responsive to the access enable signal, the central processing unit sends the second access request signal to the memory.

A combination of the last-mentioned two's complement calculator 17 and adder 18 serves as a comparator for comparing the shifted difference with the reference number calculated for the first data to produce a result of comparison. Inasmuch as the shifted difference is related by the predetermined number to the difference calculated by the difference calculator comprising the first-mentioned two's complement calculator 13 and the adder 14 therefor, the comparator carries out the comparison in consideration of the predetermined number. Responsive to the result of comparison, the inverter 19 produces the access enable signal.

Additionally referring to FIG. 3, operation will be described regarding the device illustrated with reference to FIG. 2 with the assumption that the memory is of the structure described in connection with FIG. 1 and that the predetermined time interval and the predetermined number are sixteen clock cycles and four, respectively. It will furthermore be assumed that the data element number and the leading address of the first data are sixty-four and 0, respectively, and that the leading address for the second data is 1. The second data has a certain data element number.

The trailing address calculating adder 11 adds the data element number of sixty-four to the leading address of 0 into the sum and subtracts one from the sum to provide 63 as the trailing address for the first data. In the meanwhile, the second access request signal is produced in the central processing unit. The difference calculator calculates the difference, which is equal to sixty-two for the first and the second data. The shifted difference is equal to fifteen.

In FIG. 3, zeroth and other time instants $T_0$, $T_1$, and so on are shown along a top or first line. The clock or machine cycle is equal to an interval between two successive ones of the time instants. The memory units 0 through 63 are accessed for the first data by the first access request signal as indicated along a second line. Among the four consecutive memory units 0 to 3 which are first accessed by the first access request signal, attention will be directed to the memory units 1 to 3 on controlling the successive access by the first and the second access request signals. The memory units 1 to 3 are busy during the predetermined time interval, namely, between the zeroth and the sixteenth time instants $T_0$ and $T_{16}$, as illustrated in a left part of a third line. The memory unit 4 is busy between the first and the seventeenth time instants $T_1$ and $T_{17}$ as shown in a left part of a fourth line. The memory units 1 to 4 are the four consecutive memory units which should be first accessed by the second access request signal as illustrated in right parts of the third and the fourth lines and along a fifth line.

The access signal of the first access request signal has the predetermined logic level between the zeroth and the sixteenth time instants $T_0$ and $T_{16}$. In the manner depicted along a bottom or sixth line of FIG. 3, the reference number register 15 holds the reference number which is meanwhile equal to sixteen. After the sixteenth time instant $T_{16}$, the access signal does not take the predetermined logic level. The reference number therefore becomes equal to the reduced number.

Until the sixteenth time instant $T_{16}$, the reference number of sixteen is greater than the shifter difference of fifteen. The result of comparison is therefore negative. The most significant bit of the second adder output signal represents logic one. The access enable signal is therefore rendered logic zero to prohibit delivery of the second access request signal to the memory. After the sixteenth time instant $T_{16}$, the reference number is no longer greater than the shifted difference. The result of comparison is not negative. The access enable signal becomes logic one to enable delivery of the second access request signal to the memory. In fact, the memory units 1 to 4 are not busy at the seventeenth time instant $T_{17}$. No conflict occurs even if the second access request signal is sent to the memory.

It may be that the subtraction carried out by the difference calculator gives a negative difference. For example, let the trailing address calculating adder 11 calculate 5 as the trailing address for the first data. If the leading address for the second data is 55, the difference is equal to ($-50$). Inasmuch as the adder 14 of the difference calculator calculates the sum modulo for the number of memory elements, sixty-four in the case being taken into consideration, the difference and the shifted difference become equal to fourteen and three, respectively. The access enable signal is kept at logic zero until the reference number eventually becomes equal to three.

While this invention has thus far been described in conjunction with a preferred embodiment thereof, it will now be readily possible for one skilled in the art to develop various other embodiments of this invention. For example, the adder 14 of the difference calculator may produce the difference as it stands. In this event, a multiplier should be interposed either between the reference number register 15 and the two's complement calculator 17 therefor or between the last-mentioned two's complement calculator 17 and the adder 18 of the comparator. The multiplier should be responsive to the current mode of operation of the computer for multiplying the reference number or the two's complement thereof by the predetermined number.

What is claimed is:

1. A device for controlling access to a memory at the end of machine clock cycles by access request signals for a first and a second data, each data consisting of a sequence of data elements, each sequence consisting of a leading and trailing element comprising:

a plurality of consecutively numbered memory units which are accessible by serial addresses assigned thereto according to consecutive numbers thereof for storing the data elements of said first and said second data;

address calculating means responsive to each access request for calculating a trailing address assigned to a memory unit for the trailing element of the data accessed by said access request signal wherein each access request signal indicates the number of data elements in a sequence and the leading address of the leading element in the data assigned to the respective memory unit and wherein a predetermined number of memory units per machine clock cycle are accessed during a predetermined time interval;

address holding means for holding said trailing address;

difference calculating means coupled to said address holding means and responsive to the leading address indicated by the access request signal for said second data for calculating a difference between the trailing address held in said address holding means for said first data and the leading address for said second data;

number calculating means for calculating, after the machine clock cycle in which said first access request signal ends, a reference number which is equal to said predetermined time interval minus the number of machine clock cycles following said machine clock cycle in which said first access request signal ends wherein said reference number is calculated for said first data for controlling access to the memory by said second data; and comparing means for comparing said difference with said reference number calculated for said first data to produce an access enabling signal from the result of said comparison for use in enabling delivery to the memory of the access request signal for said second data.

2. A device as claimed in claim 1, wherein said comparing means comprises:

a comparator for comparing said difference with said reference number to produce a result of comparison; and means for producing said access enabling signal when said result of comparison represents that said difference is not greater than said reference number.

3. A device as claimed in claim 1, wherein said comparator comprises:

means for dividing said difference by said predetermined number to provide a shifted difference wherein said shifted difference is the greatest integer less than the quotient arrived at by said means for dividing; and means for comparing said shifted difference with said reference number to produce said result of comparison.

4. A device as claimed in claim 1, wherein said memory units comprise a preselected number of memory units and wherein said difference calculating means calculates a difference modulo from said preselected number of memory units.

* * * * *